No. 706,735. Patented Aug. 12, 1902.
R. A. FESSENDEN.
WIRELESS TELEGRAPHY.
(Application filed Dec. 15, 1899.)

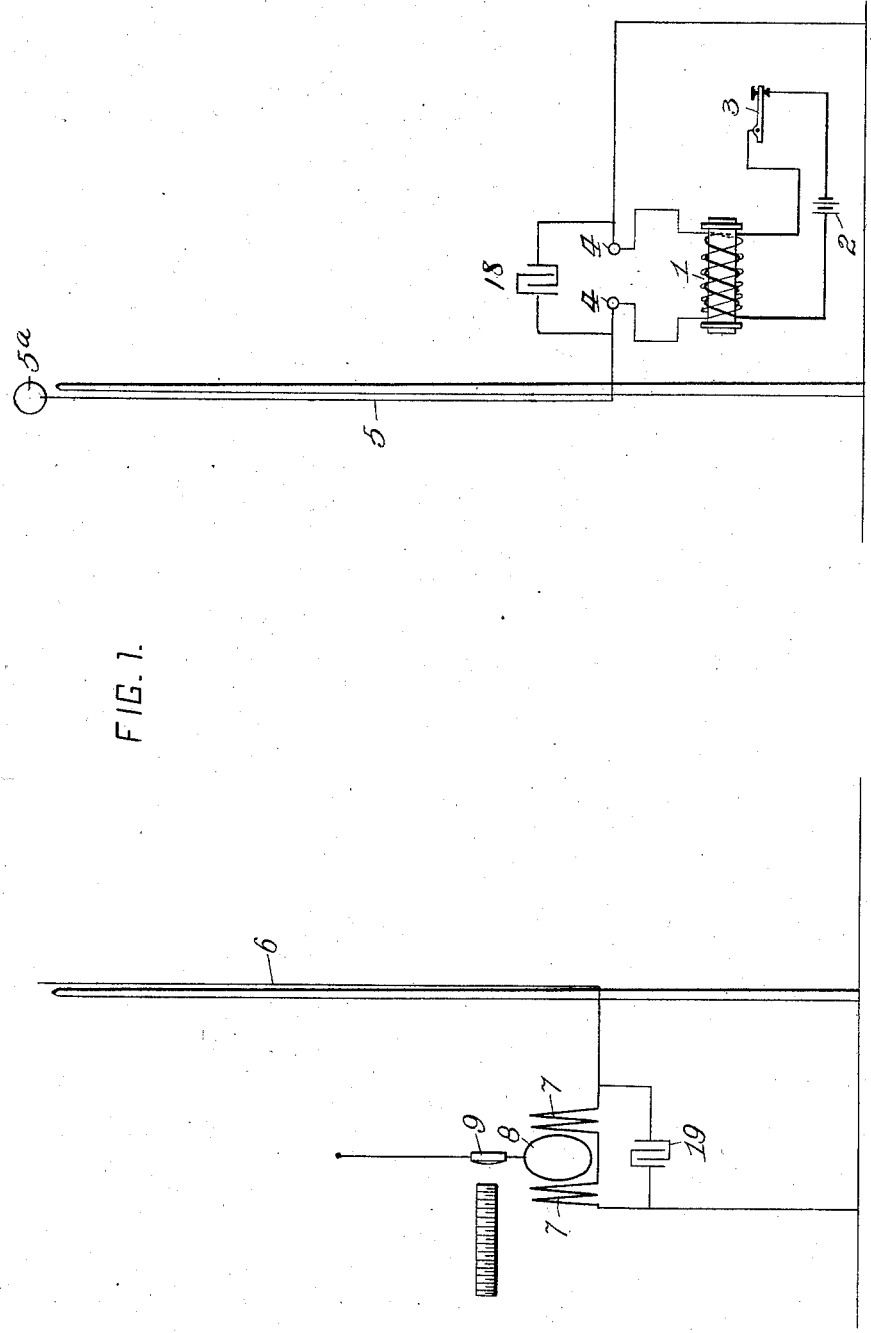

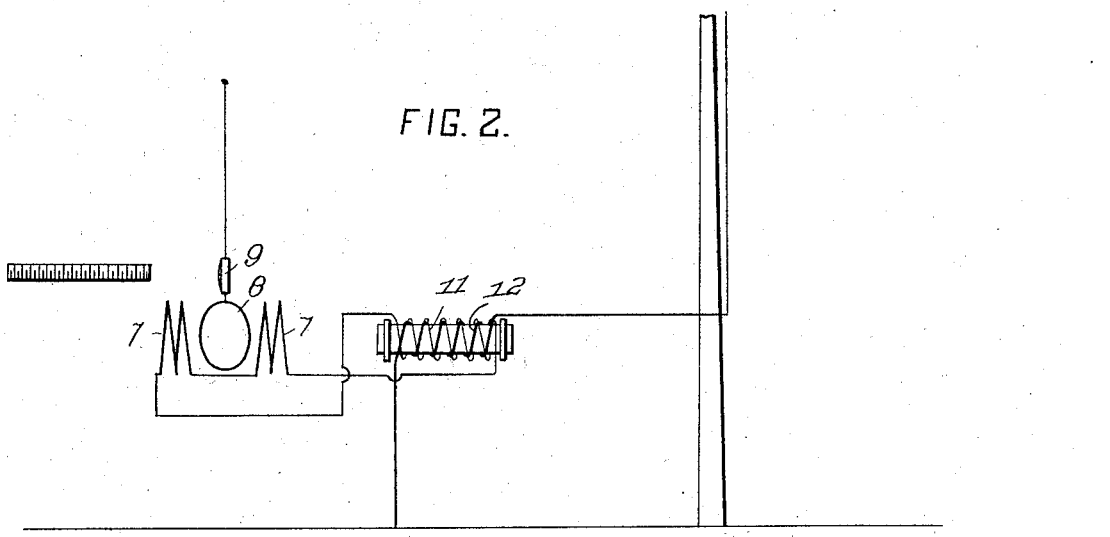
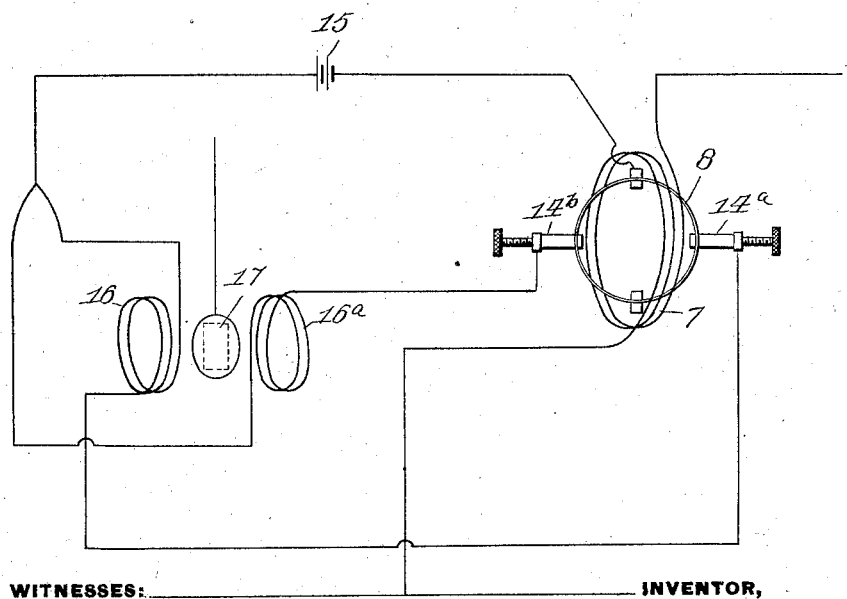

(No Model.) 3 Sheets—Sheet 3.

WITNESSES: INVENTOR,
Herbert Bradley Reginald A. Fessenden
F. M. Dapper by Samuel S. Wolcott
Att'y.

THE NORRIS PETERS CO., PHOTO-LITHO., WASHINGTON, D. C.

UNITED STATES PATENT OFFICE.

REGINALD A. FESSENDEN, OF ALLEGHENY, PENNSYLVANIA.

WIRELESS TELEGRAPHY.

SPECIFICATION forming part of Letters Patent No. 706,735, dated August 12, 1902.

Application filed December 15, 1899. Serial No. 740,429. (No model.)

*To all whom it may concern:*

Be it known that I, REGINALD A. FESSENDEN, a citizen of the United States, residing at Allegheny, in the county of Allegheny and State of Pennsylvania, have invented or discovered certain new and useful Improvements in Wireless Telegraphy, of which improvements the following is a specification.

The invention described herein relates to certain improvements in the electrical transmission of signals from one station to another without the use of conductors connecting such stations.

In the methods heretofore employed the electromagnetic waves generated at the receiving-station produce voltages in the receiving-circuit. These voltages passing through a suitable material normally non-conductive render the same conductive, and thereby permit the passage of a current through a circuit in which said material, usually termed a "coherer," is included. After the cessation of the voltages produced by each series of electromagnetic waves generated at the sending-station the coherer must be operated on in some way to restore it to normal or non-conductive condition.

The object of the present invention is to provide for the generation by currents produced by electromagnetic waves of currents in a second element or circuit and by the reaction of the current in this second element or circuit on the field formed or produced by the currents in the receiving-wire to produce motion which is directly or indirectly observable.

In general terms the invention consists in the generation by electromagnetic waves of a current directly or indirectly in coils at the receiving-station, the current in said coils inducing a current in another element or circuit which is arranged in such relation to the coils that the current induced therein reacts with the field produced by the coils, thereby producing motion.

The invention is hereinafter more fully described and claimed.

Figure 3:
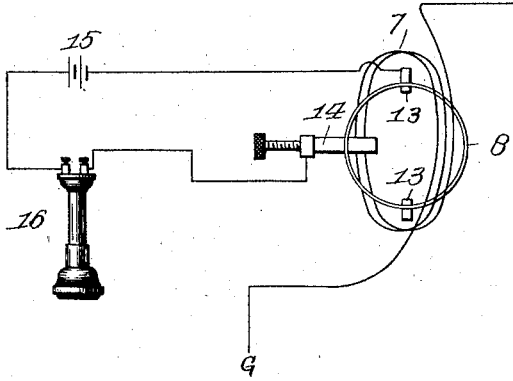
Figure 4:
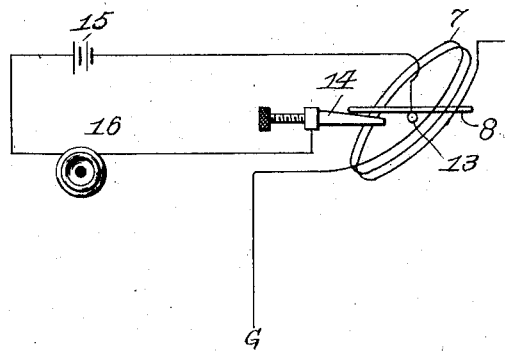

In the accompanying drawings, forming a part of this specification, Figure 1 is a diagrammatic view showing the arrangements employed at the sending and receiving stations. Figs. 2 and 3 are diagrammatic views illustrating modifications of the receiving apparatus. Fig. 4 is a side elevation of the apparatus shown in Fig. 3, and Fig. 5 is a further modification of the receiving apparatus.

The apparatus employed at the sending-station may be similar to that now in use for the generation of electromagnetic waves and consists of an induction-coil 1, having its primary coil in circuit with a generator 2, said circuit having a make-and-break mechanism 3 included therein. One of the discharging knobs or terminals 4 is connected with the vertical sending-conductor 5, while the other knob or terminal is grounded. I have found that by placing a capacity formed by a body $5^a$ of conducting material having a comparatively large radiating-surface the waves generated at the sending-station have a very much higher energy, thereby correspondingly increasing the effect or energy of the current produced in the receiving-conductor.

The terms "sending-conductor" and "receiving-conductor" are employed herein as indicating all of the circuits at the sending and receiving stations from top to ground, if grounded, or if not grounded from one extreme end to the other extreme end, including all apparatus in series with the circuits, while the term "radiating portion" indicates all of the sending-conductor from top or extreme end of same to point of junction with the apparatus for effecting the oscillatory charging and discharging thereof, such as sparking terminals, transformer-coils, armature-windings, &c. By the term "electromagnetic waves" as used herein is meant waves of a wave length long in comparison with the wave length of what are commonly called "heat-waves" or "radiant heat." By "grounded conductor" is meant a conductor grounded either directly through a capacity, an inductance, or a resistance, so that the currents in the conductor flow from the conductor to ground, and vice versa, when electromagnetic waves are being generated. The terms "tuned" and "resonant" are used herein as one including the other. By the term "current-operated wave-responsive device" as used herein and by me generally is meant wave-responsive devices having their contacts good contacts and operated by currents produced by electromagnetic waves. They are hence to be distinguished from wave-responsive devices depending for operation upon varying contact resistance.

At the receiving-station the receiving-conductor is formed by a wire or wires 6, projecting up vertically or at an inclination to a suitable height, which are also grounded. A coil or coils 7 are arranged in the circuit of the receiving-conductor 6, and an element or coil of wire 8, forming a closed circuit, is supported with a freedom of movement in such relation to the coil or coils 7 that the current produced by the electromagnetic waves will induce a current in the element 8. The element 8 is supported, preferably, in such manner that a plane at right angles to its axis will form an angle of approximately forty-five degrees, (45°,) with a plane at right angles to the axis of the coils 7, so that the reaction of the current induced in said element with the field produced by the coils 7 will cause the element 8 to move with reference to the coils 7. This motion of the element may be observable by means of a mirror 9, attached thereto, reflecting a beam of light on a scale, or said element may form a part of the circuit of a recording-siphon, &c.

As shown in Fig. 2, the coils 7 may be connected to the secondary coil 11 of a transformer whose primary coil 12 is connected in series with the receiving-wire.

A desirable means for transforming the electromagnetic waves into recordable motion is shown in Figs. 3 and 4. The element 8 is balanced on supporting-rods or knife-edges 13, one of which is formed of a good electrical conductor, as silver, the element 8 being preferably formed by a silver ring. A carbon block 14 is so arranged that a portion of the ring between the supporting-rods will normally rest lightly thereon. This microphonic contact, the conducting pivotal support, and the portion of the ring between them form parts of an electric circuit, which also includes a generator 15 and a recording instrument 16 as a telegraphic sounder or the receiver of a telephone. When a current is generated, as above described, in the coil 7, the element or ring 8 will be caused to press on the carbon block, thereby increasing its conductivity. When using a telephone-receiver as a recording instrument, the generator 15 is preferably of a character capable of producing an alternating current, as such current causes a constant vibration of the diaphragm, the vibrations increasing in intensity with an increased flow of current in the circuit. This increase in intensity of action with increased flow of current is characteristic of this form of receiver and also of the form shown in Fig. 1. In this it is sharply differentiated from such devices as the coherer, which either give a strong indication or do not give any. This characteristic is advantageous in that if the signal sent—say a dot—be too weak to give an action of the full intensity it may still in most cases be read and not missed entirely, which is of value in sending code-messages.

In the construction shown in Fig. 5 the circuit of the generator is divided, one branch including a coil 16 and connected to a microphonic contact $14^a$, while the other branch of the circuit includes a reversely-wound coil $16^a$ and is connected to a microphonic contact $14^b$. These contacts are arranged on opposite sides of the ring 8 and are so adjusted that the ring will normally rest equal on both blocks, so that an equal current will flow through both of the coils 16 $16^a$, thereby maintaining a magnetic bar 17, suspended between the coils in equilibrium with relation to the coils. Adjustable resistances may be placed in the circuits of the coils, thereby avoiding the necessity of delicate adjustments of the carbon blocks. When the coils and the ring or element 8 are energized, the pressure of the latter on one contact is increased and that on the other decreased, thereby correspondingly changing the resistances in the two branches. The increased flow of current through one coil and decreased flow through the other coil, due to the change in resistances, will produce a greater movement of the magnetic bar 17 than if only a single coil were used. The movement of the bar 17 can be rendered observable in many ways known in the electric-signaling art—as, for example, by securing a mirror thereon.

As shown in Fig. 1, a condenser 19 may be connected in shunt with the field coil or coils 7 for the purpose of obtaining as large a current as possible in the field-coil 7, as this increase in current will give a greater torque to the ring 8. When no condenser is employed, this large current must flow in the vertical wire, and there would be great loss of energy on account of the resistance of wire 6, and, further, without the condenser a large amount of energy will be required to give the statical charge to the receiving-conductor. Hence on account of the small energy furnished by the wave a large current cannot be obtained in field coil or coils 7 without the condenser. By employing a condenser of the proper size current in wire 6 may be made to have a value equal to the difference between the current in the field coil or coils and the current in the condenser. Either of these currents may therefore be large and either or both may be used to produce motion, while the current in wire 6 may be kept so small that there is practically no loss of energy on account of its resistance or of the statical charging of the receiver, and all the energy may be used in producing motion. Without the condenser the current in the field coil or coils 7 will be practically a quarter-phase behind the voltage on account of the self-inductive lag in the field-coil. If the condenser were substituted for the field-coil, there would be a current in it nearly a quarter-phase in advance of the voltage due to the capacity lead. When both the field-coil and the condenser are introduced one in shunt with the other, there will be a current in the field coil or coils lagging ninety degrees (90°) and in the condenser a current leading ninety degrees, (90°.) The sum of two currents one hundred and eighty degrees apart in phase is equal to the difference between their values. Hence if there is a current in the field coil or coils of one ampere and in the condenser a current of nine-tenths ($\frac{9}{10}$) of an ampere the current in the receiving-wire 6 will be one-tenth ($\frac{1}{10}$) of an ampere.

By the employment of a condenser in shunt with the coil or coils 7 the current in the receiving-wire is reduced without reducing the current in the coil or coils 7, so that the resistance drop, which is at times sufficiently great to affect the operation of the system, is eliminated or so reduced as not to have any material effect.

It is preferred to place a shunt-circuit containing a condenser across the terminals of the induction-coil at the sending-station for the purpose of maintaining sustained radiation. This shunt-circuit must be tuned to the receiving-conductor; otherwise the oscillations produced by it will have no action upon the wave-responsive device at the receiving-station. This shunt-circuit by virtue of its capacity stores up an additional amount of energy, and when a spark passes across the gap, since the sending-conductor can radiate energy at a given rate, it must continue to radiate for a longer time in order to dissipate this additional stored-up energy.

I am aware that apparatus consisting of a fixed primary and a movable secondary circuit has been used for detecting oscillatory currents. This apparatus was a modified form of an earlier alternating voltmeter, a silver disk or thick-rimmed annulus being substituted for the wire coil used in the voltmeter and delicately suspended so as to have a long period of swing. This apparatus was used not for the purpose of detecting electromagnetic waves emitted and received by unclosed circuits, but for detecting the magnetic inductive effects which one closed circuit (having rapidly-oscillating currents produced in it by a transformer, Hertz oscillator, or other suitable means) produced on another closed circuit. The effects to be obtained by such an apparatus were therefore different in kind from those sought in wireless telegraphy and the method of producing them were different from that described herein. This Northrup apparatus was used to detect magnetic induction effects to a distance of approximately one hundred yards. Although distances somewhat longer could doubtless have been attained with such apparatus, the method employed by Northrup is not available for commercial wireless signaling, as magnetic induction effects fall off as the cube of the distance, and approximately ten thousands of millions times the energy would be required to obtain effects with the Northrup apparatus at a distance of one hundred miles.

The construction of Northrup's receiving instrument is not suitable for the purposes of wireless telegraphy, as the movable member consists of a disk or thick-rimmed annulus, whereas the movable member of the receiving mechanism for wireless telegraphy should be a ring formed of thin wire (indicated at 8 in the drawings) having a ratio of internal and external diameters equal or approximately equal to unity. If a disk or thick-rimmed annulus should be used as the movable member of the receiving mechanism for wireless telegraphy, the efficiency of such mechanism would be so greatly reduced as to render it inoperative, for the reason that the currents induced in the disk or thick-rimmed annulus tend to get as near as possible to the center of such parts, and thereby weaken the reactive effect between the fixed and movable parts and to exert small torque, and, further, as the disk and thick-rimmed annulus have low self-induction the currents induced in them tend to get out of phase with the currents in the fixed coil or coils, and hence the torque is weakened. Moreover, the period of oscillation of a disk or thick-rimmed annulus for a given restoring force is so long that extremely-powerful restoring forces must be used to enable a mechanism having such a movable member to record signals at commercially-practical speeds, and since the force varies as the square of the speed deflecting forces many thousands of times greater must be employed than is required in the receiving mechanism described herein. In other words, the thin light ring 8 will work with but a fraction of the energy required to operate a disk or thick-rimmed annulus. By the employment of a thin ring of good conducting material and a fixed coil of few turns, as shown in the drawings, the electrical forces between fixed and movable members of the receiving mechanism are rendered more efficient, and hence the force necessary for commercially-practical signaling is greatly lessened.

The inapplicability of the Northrup apparatus is further shown by the fact that the coils of the fixed member of his apparatus consist of a large number of turns of wire, so that the resistance in such coils is high, whereas a commercially-practicable instrument for wireless telegraphy should have its fixed coil or coils formed by a few turns of wire, and consequently of low resistance. By the employment in the receiving instrument of a fixed coil or coils of few turns and a movable member formed by a thin light ring of highly-conducting wire high resonance effects combined with a rapid natural period of the moving part and a maximum efficiency are attained and the advantageous use of transformers, as in Fig. 2, is rendered possible.

It is characteristic of the method shown that the receiving mechanisms are actuated by currents produced by electromagnetic waves and not by voltages, as in the case of the coherer. Hence when the receiving mechanisms described herein are used in connection with a secondary circuit said circuit is controlled by the currents generated by electromagnetic waves and not by voltages. It is also characteristic that when a secondary circuit is used in connection with the type of wave-responsive device shown in Figs. 3, 4, and 5 a portion of the secondary circuit is traversed and controlled by currents produced by electromagnetic waves. It is further characteristic of my improved system that the indications produced by the receiving mechanism herein described are dependent upon the total amount of energy emitted to form the signal and are not, as in the case of the coherer, dependent upon the maximum of the voltage.

I claim herein as my invention—

1. As an improvement in the art of transmitting signals electrically by electromagnetic waves the method herein described, which consists in the generation of electromagnetic waves at one station and transforming the energy of the currents generated by such waves at the receiving-station into the energy of motion, that is without the necessary interposition of a secondary or auxiliary generator for the production of such motion, substantially as set forth.

2. As an improvement in the art of transmitting signals between stations by electromagnetic waves, the method herein described which consists in causing the radiation of electromagnetic waves from a grounded conductor, generating voltages by such waves in a conductor at the receiving-station and transforming the energy of each of said voltages into the energy of motion, substantially as set forth.

3. As an improvement in the art of transmitting signals electrically between stations by electromagnetic waves, the method herein described which consists in producing an electromagnetic field in a receiving mechanism consisting of relatively fixed and movable members arranged in operative relation to each other by the generation of electromagnetic waves at the sending-station, thereby causing a movement of one of the parts of the receiving mechanism, substantially as set forth.

4. As an improvement in the art of transmitting signals electrically between stations by electromagnetic waves, the method herein described which consists in the generation of a current or currents in a portion of a receiving mechanism consisting of relatively fixed and movable members by the generation of electromagnetic waves at the sending-station and then producing a current or currents in the other portion of the receiving mechanism by the current or currents generated by the electromagnetic waves, whereby one part of the receiving mechanism is caused to move relative to the other part, substantially as set forth.

5. As an improvement in the art of transmitting electrical energy by electromagnetic waves the method herein described, which consists in maintaining a secondary circuit in an energized condition and controlling the energy of said circuit by current effects produced by electromagnetic waves flowing through a current-operated wave responsive device forming a portion of the secondary circuit.

6. As an improvement in the art of transmitting electrical energy by electromagnetic waves the method herein described, which consists in prolonging the oscillations of an energy-radiating conductor by energy from a source external to the radiating-conductor and tuned to the period of the radiating-conductor, substantially as set forth.

7. As an improvement in the art of transmitting electrical energy by electromagnetic waves the method herein described, which consists in the generation of electromagnetic waves at one station and transforming the energy of the currents generated by such waves at the receiving-station into the energy of motion, varying the motion thus produced by varying the amount of energy delivered at the receiving-station without the necessary interposition of a secondary or auxiliary generator for the purpose of such motion, substantially as set forth.

8. As an improvement in the art of signaling by electromagnetic waves the method herein described, which consists in generating electromagnetic waves in a grounded conductor at the sending-station, receiving such waves at the receiving-station and transforming the energy of electromagnetic waves so received into the energy of motion by means of a receiving instrument having a low resistance, substantially as set forth.

9. As an improvement in the art of transmitting electrical energy, the method herein described, which consists in varying the conductivity of a secondary circuit at the receiving-station by motion produced by currents generated by electromagnetic waves, substantially as set forth.

10. As an improvement in the art of transmitting electrical energy, the method herein described, which consists in the generation of electromagnetic waves at one station, transforming the energy of the currents generated by such waves at the receiving-station into energy of motion, varying the currents in two or more local circuits by such energy of motion and transforming the energy of such currents into the energy of motion, substantially as set forth.

11. As an improvement in the art of transmitting electrical energy, the method hereby described, which consists in generating electromagnetic waves at one station, transforming the energy of currents generated by such waves into the energy of motion, varying the currents in two or more local or secondary circuits by such energy of motion, transforming the energy of the varied currents into the energy of motion and causing the energies of motion so produced to operate in the same direction, substantially as set forth.

In testimony whereof I have hereunto set my hand.

REGINALD A. FESSENDEN.

Witnesses:
 DARWIN S. WOLCOTT,
 F. E. GAITHER.